United States Patent
Pavlov

(10) Patent No.: US 12,198,066 B2
(45) Date of Patent: Jan. 14, 2025

(54) SYSTEM AND METHOD FOR DETECTING MISINFORMATION AND FAKE NEWS VIA NETWORK ANALYSIS

(71) Applicant: Elan Pavlov, Cambridge, MA (US)

(72) Inventor: Elan Pavlov, Cambridge, MA (US)

( * ) Notice: Subject to any disclaimer, the term of this patent is extended or adjusted under 35 U.S.C. 154(b) by 306 days.

(21) Appl. No.: 17/321,395

(22) Filed: May 14, 2021

(65) Prior Publication Data
US 2021/0342704 A1 Nov. 4, 2021

Related U.S. Application Data

(63) Continuation of application No. 17/293,748, filed as application No. PCT/US2019/061456 on Nov. 14, (Continued)

(51) Int. Cl.
*G06N 5/02* (2023.01)
*G06F 16/31* (2019.01)
(Continued)

(52) U.S. Cl.
CPC .............. *G06N 5/02* (2013.01); *G06F 16/313* (2019.01); *G06F 16/335* (2019.01); *G06F 16/953* (2019.01); *G06N 7/01* (2023.01)

(58) Field of Classification Search
CPC .... G06F 16/953; G06F 16/313; G06F 16/335; G06N 5/02; G06N 7/01
See application file for complete search history.

(56) References Cited

U.S. PATENT DOCUMENTS

| 8,312,049 B2 * | 11/2012 | Chayes | G06F 16/355 |
| | | | 707/798 |
| 8,768,782 B1 * | 7/2014 | Myslinski | G06F 16/284 |
| | | | 705/26.1 |

(Continued)

FOREIGN PATENT DOCUMENTS

| WO | 2017112808 | 6/2017 |
| WO | 2019183191 | 9/2019 |
| WO | 2020061578 | 3/2020 |

OTHER PUBLICATIONS

European Search Report, EP19954719.1, Oct. 4, 2023 (EPO counterpart application).
(Continued)

*Primary Examiner* — Mark E Hershley
(74) *Attorney, Agent, or Firm* — Norma E. Henderson

(57) ABSTRACT

A method for detection of misinformation without the need to analyze any articles (HINTS) includes forming a mixed graph containing at least two different node types, such as users and articles, with edges between users and articles, and with user weights for user nodes and article weights for article nodes. Seed nodes are planted for at least one user node and at least one article node. User weights and article weights are manually assigned to the seed nodes, then neighborhoods are defined for the seed nodes. A HITS-like algorithm is then run for a predetermined number of rounds updating both people and articles, while keeping the weights of the seed nodes constant to converge the graph for the weights of articles and users. Finally, a set of highest weights for users and/or articles is outputted and possible remedial action can be taken.

25 Claims, 2 Drawing Sheets

Related U.S. Application Data 2019, now abandoned, application No. 17/321,395 is a continuation of application No. PCT/US2019/061456, filed on Nov. 14, 2019.

(60) Provisional application No. 62/767,277, filed on Nov. 14, 2018.

(51) Int. Cl.
    *G06F 16/335* (2019.01)
    *G06F 16/953* (2019.01)
    *G06N 7/01* (2023.01)

(56) References Cited

U.S. PATENT DOCUMENTS

| | | | |
|---|---|---|---|
| 9,317,567 B1* | 4/2016 | Lu | G06F 16/2465 |
| 10,110,531 B2* | 10/2018 | Bastide | H04L 51/52 |
| 10,121,025 B1* | 11/2018 | Rice | G06F 21/10 |
| 10,997,244 B2* | 5/2021 | Russell | G06F 16/27 |
| 11,080,336 B2* | 8/2021 | Van Dusen | G06Q 10/10 |
| 11,605,017 B1* | 3/2023 | Mu | H04L 67/535 |
| 2012/0304287 A1* | 11/2012 | Yu | H04L 63/1466 |
| | | | 726/22 |
| 2013/0159127 A1* | 6/2013 | Myslinski | G06Q 10/10 |
| | | | 705/26.1 |
| 2014/0164994 A1* | 6/2014 | Myslinski | G06F 3/04817 |
| | | | 715/808 |
| 2014/0274246 A1* | 9/2014 | Tsai | G06N 5/00 |
| | | | 463/9 |
| 2015/0188941 A1* | 7/2015 | Boshmaf | H04L 63/1441 |
| | | | 726/22 |
| 2016/0197788 A1* | 7/2016 | Chrapko | H04L 43/0811 |
| | | | 709/224 |
| 2016/0212163 A1* | 7/2016 | Louni | H04L 63/1408 |
| 2016/0350675 A1* | 12/2016 | Laks | G06N 20/00 |
| 2017/0286431 A1* | 10/2017 | Lijachev | G06F 16/24578 |
| 2018/0316665 A1* | 11/2018 | Caldera | H04L 63/104 |
| 2018/0365562 A1* | 12/2018 | Volkova | G06N 7/01 |
| 2019/0018904 A1* | 1/2019 | Russell | G06F 16/9024 |
| 2019/0122149 A1* | 4/2019 | Caldera | H04L 63/102 |
| 2019/0166151 A1* | 5/2019 | Bulut | H04L 63/1433 |
| 2019/0179861 A1* | 6/2019 | Goldenstein | G06F 16/9535 |
| 2020/0067861 A1 | 2/2020 | Leddy et al. | |
| 2020/0202071 A1* | 6/2020 | Ghulati | G06Q 50/01 |
| 2021/0117814 A1* | 4/2021 | Flinn | G06N 5/045 |

OTHER PUBLICATIONS

PCT ISR, PCT/US2019/061456 (PCT parent application).
PCT Written Opinion, PCT/US2019/061456 (PCT parent application).
PCT ISR, PCT/US2020/039658 (PCT counterpart application).
PCT Written Opinion, PCT/US2020/039658 (PCT counterpart application).

* cited by examiner

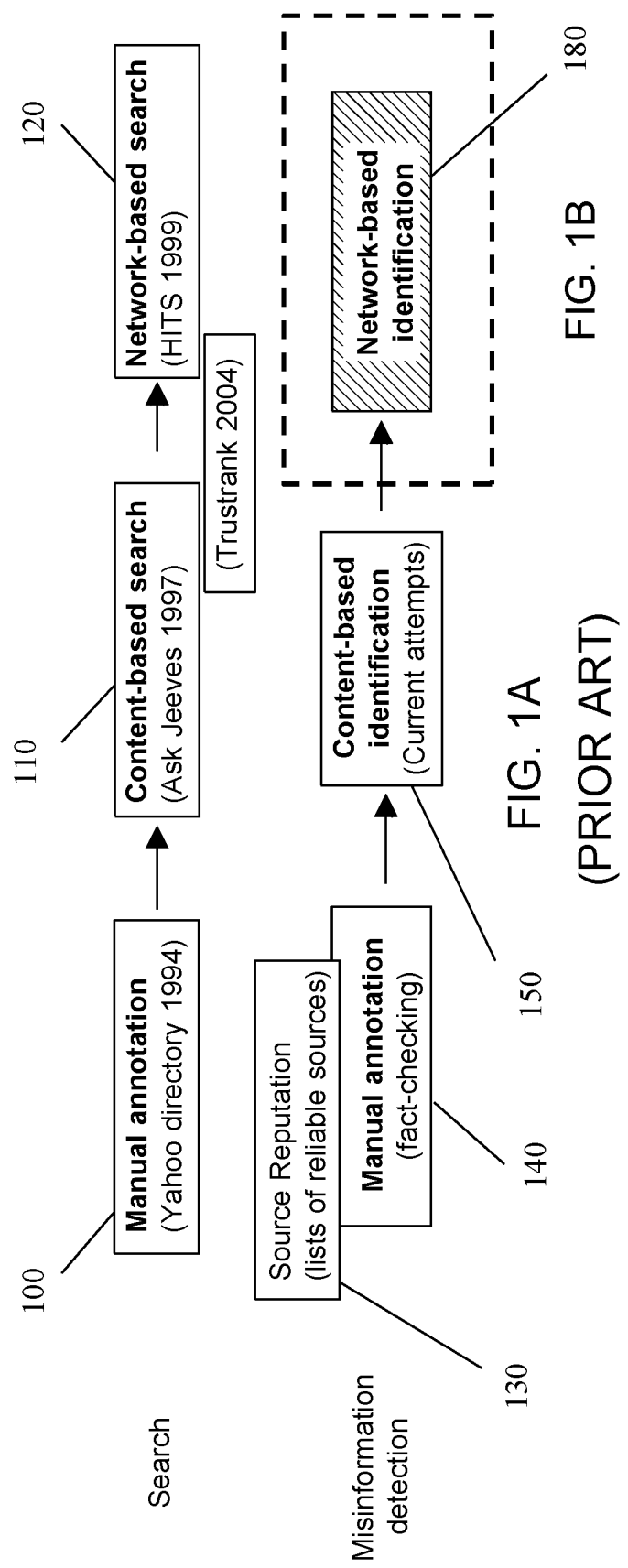

SYSTEM AND METHOD FOR DETECTING MISINFORMATION AND FAKE NEWS VIA NETWORK ANALYSIS

RELATED APPLICATIONS

This application is a continuation of PCT International App. Ser. No. PCT/US2019/061456, filed Nov. 14, 2019, which claims the benefit of U.S. Provisional Application Ser. No. 62/767,277, filed Nov. 14, 2018, the entire disclosures of which are herein incorporated by reference.

This application is also a continuation of co-pending U.S. patent application Ser. No. 17/293,748, filed May 13, 2021, which is a 371 of PCT International App. Ser. No. PCT/US2019/061456, filed Nov. 14, 2019, which claims the benefit of U.S. Provisional Application Ser. No. 62/767,277, filed Nov. 14, 2018, the entire disclosures of which are herein incorporated by reference.

FIELD OF THE INVENTION

The present invention relates to automated detection through network and, in particular, to method and systems for detecting fake news and other misinformation through network analysis.

BACKGROUND

Fake news is considered a relatively hard problem with important social impact With the rise of automated disinformation, there is a need for automated ways to identify fake news. Network analysis of the social and other accounts that share fake news can help classify or identify it, and limit its reach, as it is being shared. This is in contrast to content analysis plus source analysis, which attempt to limit fake news before it is shared.

There have been many attempts to detect, discover, and define fake news. For example, Facebook has hired thousands of reviewers to manually detect, review, rank, and mark fake news. For a documentary on this manual process, see The Cleaners (PBS, Nov. 12, 2018). Facebook has signed contracts with external organizations such as Politifact, to detect and rank fake news. Other efforts use NLP to attempt to discover fake news. Several startups use NLP for fake news detection. Most of these use a combination of humans and machine learning to analyze the content of the text/article/video, or the quality of the source, and some teach away from using network analysis. Indeed, network analysis is only useful where one has access to data about how the story will be shared. For example, "AP Verify", a joint project of Google and the AP, uses only textual understanding and humans, since at publication, AP does not have access to the data about how the story will be shared.

This problem is not unique to Facebook. For example, Reddit, Twitter, Facebook, Instagram, Whatsapp, YouTube (comments and recommendations) and email providers all face a version of this challenge.

Automated attempts to identify problematic texts from their content include Google's 'hate speech AI' and China's keyword-based censorship of social media. Twitter attempts to detect bots with humans reporting.

Other efforts exist. For example, "Our previous work on the Credibility Coalition, an effort to develop web-wide standards around online-content credibility, and PATH, a project aimed at translating and surfacing scientific claims in new ways, is part of two efforts of many to think about data standards and information access across different platforms. The Trust Project, meanwhile, has developed a set of machine-readable trust indicators for news platforms; Hypothesis is a tool used by scientists and others to annotate content online; and Hoaxy visualizes the spread of claims online." [Gynes, Nat, et al., "How Misinfodemics Spread Disease", The Atlantic, 30 Aug. 2018]

However, these efforts can be fooled by manipulating the exact words used in an article (or tweet), and have issues with detecting sarcasm, irony, criticism of the problematic texts, and other subtle elements of discourse. For some mediums such as videos (e.g., beheadings by ISIS) or photos, text search does not work and other methods are employed which are not sufficient.

Examples of other attempts at ranking and increasing trust in news include Trusting News (Mayer and Walsh), The Trust Project (Lehrman, Santa Clara University's Markkula Center for Applied Ethics), News Integrity Initiative (Jarvis, de Aguiar, CUNY Graduate School of Journalism), Trust & News Initiative (Adair, Duke Reporter's Lab), NewsGuard (Brill, Crovitz, Warren, Effron), Deepnews.ai (Filloux, Stanford students), and The Journalism Trust Initiative (Reporters Without Borders).

One notable attempt is TrustRank, which attempts to combat web spam by defining reliability. TrustRank uses a seed of reliable websites (selected manually) and propagates reliability by using Pagerank. Notably, TrustRank does not utilize passive data collected from user behaviors, or measures of user reliability.

Domain identification and blacklisting of fake news has been suggested but is easily circumvented Moreover, it does not detect small and seldom used domains. Other attempts at domain identification include Newsguard, which is not as accurate as could be desired.

After the priority date of the present invention, an MIT professor published an article in the prestigious journal PNAS, which was granted prominence as a journal preprint and received noteworthy press reports, as well as a press release and placement on the MIT website [Pennycook, Gordon et al., "Fighting misinformation on social media using crowdsourced judgments of news source quality", PNAS Feb. 12, 2019, 116 (7) 2521-2526, first published Jan. 28, 2019]. It is important to note that this solution has problems in that it weighs users linearly and does not take into account the variability in user quality. It is thus a special case and is not optimal. Despite this, the publication shows the novelty and importance of the present approach. This result was also covered in The Poynter Institute for Media Studies newsletter of 31 Jan. 2019.

Search is an important component of the way we use the Internet. Early search engines attempted to understand pages in terms of how humans classified them. For instance, the Yahoo directory attempted to manually annotate and rank the content of the web. Manual ranking suffered from immense scaling issues, and fell out of favor.

The next generation of search engines tried to understand page content automatically. Methods such as tf-idf (term-frequency inverse document-frequency) or natural language processing were widely used. Difficulties arose due to the complexity of natural language processing, language subtleties, context and differing languages; however this is still is a component of many search tools.

The current generation of search engines utilizes very different mechanisms. Algorithms such as HITS and Pagerank have become mainstays of modern search. The unifying factor is that they look at networks of webpages, bootstrapping reliability and relevance scores, more than they look at the page content itself.

FIG. 1A graphically depicts the history of search and misinformation detection. As shown in FIG. 1A, search has evolved from manual annotation 100 (e.g. Yahoo directory), to content-based search 110 (e.g. Ask Jeeves), to network-based search (e.g. HITS, Trustrank) 120. Misinformation detection has evolved from source reputation (lists of reliable sources) 130 and manual annotation (fact-checking) 140 to the currently-employed content-based identification 150.

SUMMARY

The present invention uses a method that is somewhat similar to the prior art HITS method to detect misinformation and fake news, but modifies the HITS method to pair people with articles instead of Hubs and Authorities. The present invention is called Human Interaction News Trust System, i.e. HINTS. The HINTS method is recursive and more accurately identifies misinformation than HITS.

Thus, the present invention (HINTS) represents a method for detection of misinformation, without the need to analyze any articles, which includes forming a mixed graph containing at least two different node types, such as users and articles, with edges between users and articles with user weights for user nodes and article weights for article nodes. Seed nodes are planted at least one user node and at least one article node. User weights and article weights are manually assigned to the seed nodes, then neighborhoods are defined for the seed nodes. A HITS-like algorithm is then run for a predetermined number of rounds, updating both people and articles while keeping the weights of the seed nodes constant to converge the graph for the weights of articles and users. Finally, a set of highest weights for users and/or articles is outputted and possible remedial action can be taken.

An exemplary embodiment of the disclosed subject matter is a computer program product comprising an non-transitory computer readable medium; a first computer instruction forming a mixed graph containing at least two different node types, users and articles, with edges between users and articles, with user weights for user nodes and article weights for article nodes; a second computer instruction planting at least one seed user node and at least one seed article node into the mixed graph; a third computer instruction manually assigning user weights and article weights to the seed nodes; a forth computer instruction defining neighborhoods of the seed nodes; a fifth computer instruction running a HITS-like algorithm for a predetermined number of rounds updating both people and articles while keeping the weights of the seed nodes constant to converge the mixed graph for the weights of articles and users; and a sixth computer instruction outputting a set of highest weights for users and/or articles; wherein, the first, second, third, fourth, fifth, and sixth program instructions are stored on the non-transitory computer readable medium and executed on a computing device.

BRIEF DESCRIPTION OF THE DRAWINGS

Other aspects, advantages and novel features of the invention will become more apparent from the following detailed description of the invention when considered in conjunction with the accompanying drawings wherein:

FIGS. 1A-B are a set of flowcharts depicting the history and evolution of search techniques and misinformation detection, wherein FIG. 1A depicts some of the prior art search techniques and misinformation detection in historical context and FIG. 1B depicts the present invention within that historical context;

DETAILED DESCRIPTION

Figures 2, 3:
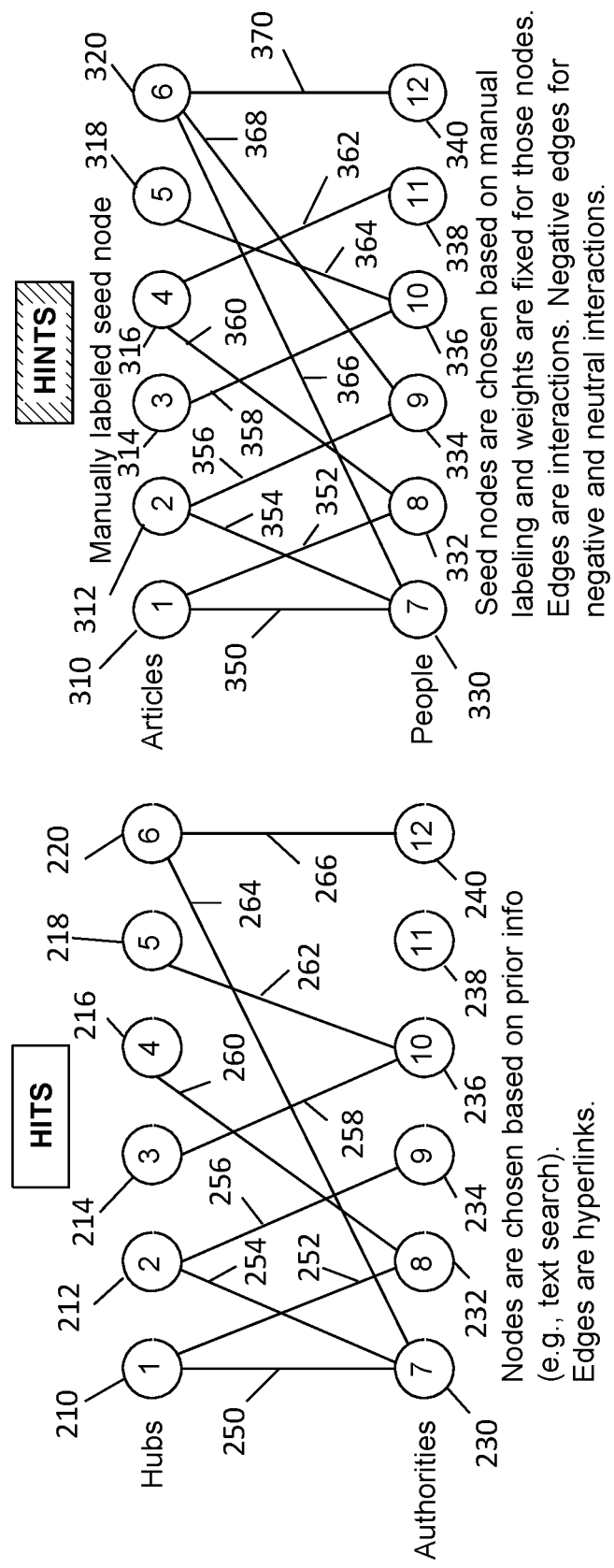
FIG. 2 is a schematic outline depicting the prior art HITS method.
FIG. 3 is a schematic outline depicting an implementation of an embodiment of the present invention.

The present invention is an automated, robust fake news detector, called the Human Interaction News Trust System [HINTS], which is used to detect fake news and misinformation, even in the presence of adversaries who know how the detector works. The key tools are network dynamics and classification of members of the network in terms of their historical interaction with news. The present invention looks at how known and suspected fake news propagates in a dynamic network of people, and uses this data to identify new posts/publication/news items that are likely to be fake as well. This also gives information about accounts controlled by an adversary. Platforms can use this data to limit the damage a fake news article can do by limiting the reach of such an article. Furthermore, while limiting its reach, they can still increase confidence in the fakeness of the article, e.g. by making it visible to small groups of users whose use patterns are the strongest indicators.

FIGS. 1A-B are a set of flowcharts depicting the history and evolution of search techniques and misinformation detection, wherein FIG. 1B depicts the present invention within that historical context. As seen in FIG. 1B, the field of misinformation detection has now evolved to the present invention, which employs "Network-based identification" 180.

FIG. 2 depicts the prior art HITS method. As illustrated in FIG. 2, in HITS, nodes represent Hubs 210, 212, 214, 216, 218, 220 and Authorities 230, 232, 234, 236, 238, 240. Nodes are chosen based on prior info (e.g., text search). Edges 250, 252, 254, 256, 258, 260, 262, 264, 266 are hyperlinks. Each node is assigned two numerical scores. The Authoritative score indicates how likely a given webpage is likely to have good information, while the Hub score indicates how likely the hub is to link to pages with a good Authoritative score. A page with a good Authoritative score is pointed to by many pages with good Hubness, and one with a good Hub score points to many Authoritative pages. These definitions are recursive, as each page's score references the scores of neighbors in its link graph. This recursion is solved by assigning initial weights to each page and updating the scores until the values converge.

The present invention modifies the HITS method to pair people with articles. The HINTS method of the present invention is recursive and more accurately identifies misinformation than HITS. FIG. 3 depicts an example implementation of an embodiment of the HINTS method. As depicted in FIG. 3, seed nodes represent Articles 310, 312, 314, 316, 318, 320 and People 330, 332, 334, 336, 338, 340. Seed nodes are chosen based on manual labeling and weights are fixed for those nodes. Edges 350, 352, 354, 356, 358, 360, 362, 364, 366, 368, 370 are interactions. Negative edges are used for negative and neutral interactions.

The present invention works for a wide variety of classification problems.

Applying the present invention to news sharing

A key insight behind the fake news detector is that we focus on limiting the exposure of people to fake news, rather than trying to block all such news from being shared. This dramatically increases the cost of spreading fake news, as it is most cost effective when people spread it on their own. For instance, there is very little fake news on broadcast television.

We identify people who are disproportionately likely to spread fake news, and use this to weight the credibility of what they share. The proverb "consider the source" shows that we already implicitly weigh the source of a statement in deciding how much to trust it.

This leads to the following working definition: A credulous person is someone who disproportionately interacts positively with fake news, and a piece of fake news is one that is interacted with disproportionately by credulous people. Of course, some of these credulous accounts are intentionally sharing fake news, and may not be real people. As with HITS, this definition is recursive and converges: we assign an initial fake value to each article and a credulous value to each user, and iterate.

Depending on the application, modes of interactions can include liking, sharing, spending time reading a source (estimated by, for instance, mouse movement over an article), commenting, reposting, following, favoriting, and the like. Other metrics such as bounce time (amount of time before user returns to previous page) and changes in search patterns can also be used. For any individual, this signal might be weak (or wrong)—for example, some individuals might comment to disprove an article. However different modes of interaction can be assigned different weights, to make the aggregate signal useful. (And, despite disclaimers, retweets are endorsements.)

The method of user identification can vary. Some websites have enough user activity on their website to rank the user by themselves. Others can utilize plugins on other websites such as Facebook or Twitter plugins, or can use the browser, such as Google sync, which tracks data through backup of users' behaviors.

Another way is to utilize ad network data, such as cookies on a user's computer, or device identification, or device fingerprinting to identify users—to calibrate a user's information level or other traits. Yet another way is to use browser history. Further methods are possible.

Thus, similar to HITS, we can define a graph. In the case of fake news, the graph will be bipartite (HITS itself is not bipartite, but a person and a webpage are different entities), in which on one side are people and on the other side are articles or posts (or clusters of articles and posts), and there is a weighted link where there is an interaction between a person and an article. The weight can depend on the type of interaction, and can be negative if the person saw but declined to interact with the article—e.g., if a person habitually interacts with links they see on their twitter feed, and we know (or can assign a probability) that they saw an article and did not interact with it. Weights can be modified by the individual's propensity to interact with content (this would be equivalent to the 'out-degree' measure in the original HITS algorithm). Weights can also be modified based on personal information about the user, such as gender, age, political affiliation or other attributes (either known or attributed).

Negative links are novel to this use case; among web pages, we don't have negative links: while we see which links exists on a webpage, we do not see which pages an author considered and rejected.

In order to seed the algorithm and teach it, we can use existing labeling by humans (note that a given article/user can have multiple labels with multiple levels of confidence). Sources that label data include Politifact, ABC News, the Associated Press, FactCheck.org, Snopes, and AP Verify. When an article is manually fact checked, we can set the 'fakeness' value of that article to zero or one (or some appropriate value). While the algorithm can modify the fake news value for most articles, articles which are manually checked can optionally be pegged to that value, and the algorithm will not update them. This does not interfere with convergence.

A user can similarly be assigned a fixed credulous value of one if it is known to be a bot controlled by an adversary.

Clustering: when an article is marked as being untrustworthy, we do not merely mark an individual link. We can aggregate links to similar stories, or similar links to the same story. This is similar to how Google News aggregates stories based on text similarity. Obviously if multiple links point to the same text (e.g., short links such as bit.ly) it is even easier to aggregate stories. Users can similarly be clustered when the same user has accounts on multiple platforms. Users can be identified/linked e.g., by cookies on their computers, browser fingerprinting or other methods. If users cannot be identified the algorithm will still work but convergence will be slightly slower.

The spread of news in a social network is different from new webpages. In particular, the speed of distribution is much faster. So, it is useful to calculate marginal values for the ranking of articles and people based on the already-calculated values from the graph at a prior time point. This makes it unnecessary to recalculate the values from scratch (though that can be done as a sanity check from time to time). For example, we can frequently update the fakeness of an article based on user interactions, and only update the user values infrequently, or when a new user appears.

Updating one side of the graph (e.g., articles) much faster than the other side of the graph (e.g., users) is a novel need for this type of graph. We can also update the values of users with a limited number of steps. All of these methods introduce additional error, but it is small compared to the signal.

Applications

Given these rankings, various actions can be taken. For example, pages or sources can be down-ranked and appear less frequently in newsfeeds or social media feeds. Warnings can be displayed or sources can be banned. It is also possible to show information from other sources to counterbalance. Of course, this can require some integration with other providers. However, in some cases a plugin can be used similar to how Adblock hides ads or how Facebook purity filters posts.

Extended Use Cases

While we have focused on fake news, similar analysis can be performed on other issues or objectionable content. For example, we can think of hate speech or deep fakes.

Note that the same person will have different scores for different propensities. It is possible that some sources (e.g., bots) might have high scores in multiple areas. For instance, some people are particularly good at detecting deepfakes. Propaganda, conspiracy theories, and misinformation are subject to similar analysis. This scoring can also be used to divide people into a variety of bins. For example, given a seed of political affiliation (e.g., Fox news links vs MSNBC links) one can detect political affiliation as well as the bias of various news outlets. It is particularly useful where there is a correlation between the properties of the different types of entities.

Another use case is identifying patterns of small social media channels. For example, some chat servers running the Discord chat tool have issues with Nazi communities forming against the wishes of the server maintainers. Some of these have names such as "Nazism 'n' Chill," "Reich Lords," "Rotten Reich," "KKK of America," "Oven Baked Jews," and "Whitetopia." By manually labeling these groups we can then use the algorithm to find other groups which are disproportionately inhabited by Nazis. These can be shut down or marked for manual inspection. Similar efforts can be done for chatrooms frequented by ISIS or other militant groups.

The place of a "user" can be replaced with other aspects of identity, such as IP address, username, typing habits, or any other method of statistically identifying a user across time or location. This identification can be unique or merely probabilistic.

We can also seed such a network with reliable classifications of users as well as, or instead of, with content classification. For example, if a user makes a statement that "I'd be the first to sign up and help you slaughter Muslims," we can mark that user as a racist/threat and then see where similar users congregate or what articles similar users read.

One interesting effect of using users to detect servers, articles, webpages, newspapers, group, etc. is that while it is easy to change the name of a server, it is much harder to simultaneously change all of the users. Thus even if an adversary tries to rename, reinstall, and/or move their chatrooms/webpage/twitter account/and the like, they must simultaneously change their users base IDs (which can be tracked, e.g., using adtech which tracks users across the web). This poses some technical difficulties for an adversary.

Disproportionality

A key concept is the notion of disproportionate actions or interactions. This notion is governed by the comparison of a user(s) with a control group. Ideally this control group would be matched as to aspects such as age, country, language, education, gender, etc. If the matching is not done properly, the algorithm will still work, though it will have reduced power and hence more people will be exposed to the content of interest.

Control matching can be discovered in a variety of ways. For example, FaceBook or Linkedin explicitly know demographic characteristics, while Ad networks know them implicitly.

Adversarial Models

A great deal of time and money is invested into propaganda and fake news networks. We expect adversaries to try to outwit detection methods, for instance by creating fake profiles which appear to be benign (e.g., no interaction with any fake article) until they are called upon to manipulate the algorithm. However compared to the sybil attacks possible on current platforms, this is expensive and time consuming for an adversary.

In particular, in contrast with traditional sybil attacks, where a successful sybil account becomes more effective over time as its follower count increases, our network analysis reduces its effectiveness after its first few broadcasts of fake items.

Compounding and Chaining

We can chain this method with other known methods of identifying fake news. Popular methods of identifying users across multiple websites, such as tracking cookies, are used to identify a user across multiple websites. This lets us identify users who visit problematic websites (e.g. Stormfront) and mark other websites (e.g., the benign sounding Odinia International or Vanguard News Network) as being problematic, since they disproportionately share a common user base.

Similarly, with Nazi chat rooms on Discord, we can seed the algorithm with Nazi websites to identify users (using the graph with websites and users) and then use those users to identify problematic chat rooms. Alternately we could start with any of the levels and reach any other (e.g., start with seeded chatrooms and end up with websites).

Note that it is possible to treat each level separately. For example, we can complete the computations on a bipartite graph of webs and users before starting the computation on users and Discord chatrooms. We can also do this in parallel with a single graph containing all of the entities (e.g., users, websites, and chatrooms) and weights measuring the connections. This can be done e.g., by utilizing belief propagation.

Note that this method can be used either independently or in conjunction with other methods, such as manual human input or NLP.

A Variant Example

There have been many attempts to rank webpage quality. For example, moz.com has a list of criteria to rank the quality of webpages. Similarly, so does support.google.com. We can use our invention to increase the accuracy of such attempts. For example, we can use cookie tracking to identify users. We can then manually identify a set of high quality websites (e.g. websites ending in .edu or .gov). We can use high quality websites if desired. We can then define a graph which consists of websites and users. A user is linked to a website if they visited (e.g., within the last month). Websites are linked to each other if they have a link (similar to how it works today). The user can be linked if they share properties (e.g. known demographics). We can then run Pagerank on the graph to determine quality of websites. It is also possible to achieve other properties by judiciously choosing the initial seed of websites. For example, choosing a seed of the websites for high quality cars will allow us to find a set of users who are interested in high end cars. Such users are disproportionately likely to be interested in other similar sites. This increases the accuracy of web targeting and ranking since we can incorporate the actual behavior of users.

Clickfraud

Click fraud is when an adversary attempts to fool an ad network to think it is receiving valid clicks when it is not (despite the name this also refers to impressions and actions). This then causes the advertiser to pay for the ads it allegedly served to clients. For example, in one scheme, an adversary created a network of fake users to consume ads. The users were created based on profiles of real users of apps. These users had the same click behavior, and the same activity as other users, except they were multiplied by created fake personas. In this case we have a network of humans (and personas) and of apps (through which the ads were served and where the money was connected). Note that the personas disproportionately interact through the compromised apps (in fact they exclusively interact through the apps. By tracking users through multiple apps (e.g. by fingerprinting or other methods) we can detect that these users interact disproportionately through a small set of apps, and take action. In order to circumvent this detection, the fake personas would have to reduce their proportion of activity through the compromised apps to approximately background activity of a normal actor, in order to avoid detection. This greatly reduces the value of this scheme to the adversary.

In this case, the apps (or parts of the apps) are acting in a way similar to the URLs, and the users are acting as users (identified e.g., by fingerprinting). Thus, we have a bipartite graph, with two parts (users and apps) and can use the algorithm as before.

This also works for detection of purchased likes on, e.g., Instagram.

Pseudo Code

The following pseudo code provides a concrete example of an embodiment of the present invention. It should be noted that numerous other embodiments and code are possible and are within the scope of the present invention.

(1) Create a graph which consists of users and news articles. There is an edge between a user and an article, if the user interacted (e.g. liked) an article and a negative weight between a user if the user saw the article and did not interact. Users are not necessarily just individuals, but any entity that can consume or distribute information including hashtags. Articles are not necessarily just news articles and the like, but any type of information that is distributed to any group of users over any network with any technology.

(2) Start with a labeled set of data (e.g., Snopes, Politifact). Mark it as fake.

(3) Use the HITS (or Pagerank) algorithm to converge the graph for the weights of the articles and users. A HITS-like algorithm is any algorithm that converges the graph for the weights of multiple sides of a mixed graph.

(4) Mark articles with a fake score above a threshold.

(5) (Optionally) extract fake articles to feed into a text algorithm for earlier detection.

The technique of the present invention can be used as a standalone method, or can be incorporated as a signal or input to other methods. For example, our system can be integrated into content ranking on Google, or used as a prefilter for human filtering by Facebook.

It is also interesting to note that after the seeding, our method does not need to analyze the data. This can be useful in such cases as encrypted communications.

Extension to increase labeled data for semantic analysis

A possible problem with our method is that it requires data from users, and hence we must allow an adversary to expose some users to the content we wish to avoid. However, conventional methods suffer from the lack of sufficient labeled data to do NLP/ML/semantic analysis properly. One way of improving our results is that we can use the output of our method as input for semantic analysis. For example, by giving an NLP algorithm the labels of articles (and potentially the margins or other aggregate data), we can increase the size of the labeled data which is available for NLP. Note that this can be done in a privacy preserving fashion.

User Interface

Since the output of the algorithm depends on the labeled seed, it is useful to have an easy method for labeling data. One way to do so is to have a search (e.g., Google search) find related articles and show them to a user who can then manually click a True/False button next to each article. It is also possible to have multiple buttons for different aspects (e.g. True/False and conspiracy/Not). This UI can make easier to feed a new seed/query into the system.

Feedback Loops

HINTS can also be paired with machine learning classification methods to improve fake news detection before network interaction. HINTS scores collected for a set of articles could provide a set of labelled training data for Technical Workflow and Example

TABLE 1

| Stage | Comments | Example |
|---|---|---|
| Choose seeds (explicitly or implicitly labeled) | Can be manually annotated or self annotated such as #QAnon or users in a group | We choose #Khashoggi as our seed. The meaning of our label is right wing political hashtag. Note that this is not completely error free since some people use it differently. Any of numerous other hashtags could be used |
| Define neighborhood. These are the set of nodes (people/pages/hashtags) which are linked to by the seeds. Neighborhood should be a sample/all of distance at least 2 for best results. Larger neighborhoods have more power | The edges are of the form (A posts hashtag B) and (B is posted by A) | We choose a sample of 1000 users who had used the hashtag. Total users was over 25 k but we used less for faster computation. Again, any number could be used and is within the scope of the present invention. |
| Run the propagation algorithm to propagate the labels with appropriate weights | | We ran 3 rounds of updating both people and hashtags while keeping the weights of the labeled hashtag constant. Convergence is very fast. Any number of rounds could be used. |
| Output the top weights which are now labeled (with error probabilities) Optionally run an NLP/ML algorithm on the larger labeled data set | Can output both links/hashtags as well as people. | The algorithm found other right wing political hashtags as expected. Examples are: #AmericaFirst, #MAGA, #RedWave Beto illegally fund caravan | training a classifier to predict trustworthiness of future articles. Current content-based detection methods rely on human labeling. The speed at which HINTS labels could be collected would reduce the lag in current content-based methods that inhibit scaling and increase exploitability.

The labeling via network analysis also provides a margin which can be treated as a confidence level into the NLP. This is useful for some applications. For example, when feeding into a Bayes net, knowing the weights on the labeled sample provides additional value and can improve the accuracy of the classifier.

Multiple Weak Learners

NLP approaches oftentimes have a margin. The use of HINTS approach has an assigned probability which can also be thought of as a margin. Thus, we can combine both of these methods (as well as potentially other methods) by using ML techniques, such as boosting. One advantages of this is that it reduces the number of users which have to interact with a given piece of content before we can do classification.

Time Based Linkages and Harassment

Another useful application of the present invention is to detect harassment. There are cases of harassment of online figures which are coordinated in sites. The ability to coordinate harassment is important for the psychological effect it has on the victim.

The present invention can disrupt the loop. For example, we can create a bipartite graph with celebrities (or other potential victims) on one side of the graph and people who contact them on the other side. We can restrict the graph to contact within a given time period. We can then run hits on the bipartite graph with celebrities and contacts to discover the correlations between contacts and remediate (e.g., by rate limiting, prohibiting suspect contacts or manual inspection).

The use of time limitations or constraints on edges is useful in other applications.

Phrases

The unit of analysis does not have to be pages. It can be phrases or hashtags.

Partial Remediation for Worldview

One interesting aspect of the present invention is remediation. One novel form of remediation is to remediate the appearance of the content at issue such that only people who have not expressed an interest or affinity for the content are remediated. This reduces the perceived impact on those who share the same world view (e.g., whose score on the graph created by the seed is within a constant factor) since they are not subject to remediation effects and are not impacted by the algorithm.

Sources of Seeds and Labeled Data

There are many types of labeled data. Data can be self-labeled (e.g., using a given hashtag), labeled by manual fact checkers (e.g., datacommons.org), labeled by trustworthiness of source (e.g., papers of records), labeled by political affiliation or other methods.

Sociological Analysis

The people who interact with misinformation are not random. There are certain traits which contribute to the propensity to interact with misinformation. For example, many studies have found that older people are more susceptible to misinformation. Other studies have shown that a psychological trait known as "Need for Cognition" mediates susceptibility to misinformation even controlling for the desirability of information as reflecting the world view of the user. Other traits such as social networks, information ecologies, and social context also influence susceptibility to misinformation. There is very active research into additional traits and properties which impact on vulnerability to interaction with misinformation.

These traits vary widely. However, they all share in common the fact that these traits change slowly (if at all). This means that if we knew these traits for all users, we could assign a probability for every user to interact with misinformation. Therefore, we could simply look at which users have the traits, and invoke Bayes rule to determine the probability that a given piece of news is fake, given the users which interact with it. Unfortunately, we don't actually have the value of these traits for all users. Fortunately, we don't actually need the value. By looking at the previous interactions with misinformation, we can look at these traits as a hidden variable and still determine the likelihood that a piece of content is misinformation given the users which interact with it. This simply requires two invocations of Bayes rule, one to estimate the hidden variable based on previous interactions (with labeled data) and one to estimate the current piece of content based on the hidden variable.

In preferred embodiments, the present invention encompasses at least the following features:

(1) Ranking pages based on user input and vice versa
(2) Mixed graph with more than one type of entity (e.g., people are diff from websites)
(3) Stopping propagation based on interaction with specific users (and not just on content). Tradeoff between number of exposures and certainty.
(4) Network analysis on changing graph with increased efficiency
(5) Negative links where one looks at the lack of an expected link(s) as opposed to the mere existence of a link.
(6) Use of normalization and fixed values in graph taken from manual input.
(7) A graph with more than 2 entity types (HITS only has 1-2 types of entities depending on whether the two groups are of the same type [webpages] or not [urls & people])
(8) Use of implicit human interactions to propagate labels, where the labels are authenticity rating
(9) Aggregation of inputs from multiple users where the labels are aggregated non linearly and where the labels are of trustworthiness metrics.
(10) Collaborative filtering with manual seeds
(11) Filtering with diff user weights The subject matter of the invention is related to the field of collaborative filtering However, in contrast to collaborative filtering some of the data is labeled. There are many techniques used in collaborative filtering, such as deep learning.

The subject matter of the invention is related to boosting, in that each individual can be thought of as a weak learner and we then aggregate across multiple learners.

The solution can be used for other moderation tasks such as pornography or harassment detection. This is due to the fact that different users have different propensities to indulge in, e.g., pornography. Thus, for example, the napalm girl photograph can be differentiated from a pornographic photo since the user base that shares/interacts/views/likes the napalm girl photo is substantially different from the user base which interacts with pornography. Thus, previous interactions with porn can help determine whether this "new" photo is being interacted with in a lewd way or in a non-lewd way.

The invention can also be used in combination with Gibbs sampling. If there are different segments of the population, the known segments can be weighted differently so as to achieve better results.

Other methods may also be used to leverage the signal. For example, Bayes theorem can be used to determine the hidden variables which inform the propensity and then use the estimate of the hidden propensities to estimate the probability that a new article is fake news.

The present invention is a major improvement in networking technology and has wide applicability in the industrial field of detecting and preventing the spread of misinformation including fake news.

While a preferred embodiment is disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A method for automatic detection of misinformation located within a computer network, comprising:
   in a processor of a computer system,
      identifying which of a set of users of the computer network interact with a specific item of content having undetermined or not fully-determined reliability, wherein the item of content is an article, photo, video, gif, webpage, hashtag, link, post, comment, phrase, or any other type of item of information existing in or propagating through the computer network, wherein the item of content originated from a source that is either not known or is not one of the users that interact with the item of content, and wherein interaction with the item of content comprises at least one action selected from the group consisting of liking, sharing, reading, commenting, reposting, following a link from, searching a related hashtag, searching for related content or phrases, following the source, and favoriting;
      evaluating the reliability of the users of the computer network that interact with the item of content by identifying other items of content having a known reliability with which said users have interacted; and
      evaluating the reliability of the item of content based on the evaluated reliability of the users that interact with the item of content, in order to determine whether the item of content is likely to be misinformation, without the need to analyze the content of the item of content.

2. The method of claim 1, wherein the reliability of the users is evaluated by assessing the probability that each user will interact with misinformation.

3. The method of claim 2, wherein the probability that each user will interact with misinformation is calculated based on previous interactions of the user with previously-labeled items of content having previously-determined reliability.

4. The method of claim 3, wherein the calculation of probability is performed using a graph.

5. The method of claim 4, wherein the calculation of probability is performed using the graph by the steps of:
   forming a mixed graph containing at least two different node types, called users and articles, with edges between users and articles, with user weights for user nodes and article weights for article nodes, wherein the user nodes represent individual users in the set of users and the article nodes represent individual items of content;
   planting at least one seed user node and at least one seed article node into the mixed graph;
   manually assigning user weights and article weights to the seed nodes;
   defining neighborhoods of the seed nodes;
   running a HITS-like algorithm that converges the mixed graph for the article weights and the user weights for a predetermined number of rounds, updating both users and articles while keeping the weights of the seed nodes constant to converge the mixed graph for the weights of articles and users; and
   outputting a set of highest weights for at least one of users or articles.

6. The method of claim 5, further comprising updating a first side of the mixed graph faster than a second side of the mixed graph.

7. The method of claim 6, wherein the first side of the mixed graph is articles and the second side of the mixed graph is users.

8. The method of claim 5, wherein user weights are only updated when a new user appears.

9. The method of claim 5, wherein no article is analyzed.

10. The method of claim 5, wherein user weights are determined by comparison with a control group.

11. The method of claim 5, wherein article weights are determined by user input.

12. The method of claim 5, wherein propagation is stopped based on interaction with specific predetermined users.

13. The method of claim 5, further comprising assigning negative links between users and articles that represent a lack of an expected association between a particular user and a particular article.

14. The method of claim 5, further comprising normalization and fixed values in the mixed graph taken from manual input.

15. The method of claim 5, wherein the mixed graph has more than two node types.

16. The method of claim 5, further comprising using implicit human interactions to propagate content labels.

17. The method of claim 5, further comprising aggregation of inputs from multiple users to generate content labels.

18. The method of claim 17, wherein the content labels are aggregated non-linearly.

19. The method of clam 17, wherein the content labels are of trustworthiness metrics.

20. The method of claim 17, wherein articles may be updated more often than users.

21. A computer program product for detection of misinformation located within a computer network, the computer program product comprising a non-transitory computer-readable medium comprising a set of instructions stored on the non-transitory computer-readable medium and executed on a computing device, the instructions being for:
   identifying which of a set of users of the computer network interact with a specific item of content having undetermined or not fully-determined reliability, wherein the item of content is an article, photo, video, gif, webpage, hashtag, link, post, comment, phrase, or any other type of item of information existing in or propagating through the computer network, wherein the item of content originated from a source that is either not known or is not one of the users that interact with the item of content, and wherein interaction with the item of content comprises at least one action selected from the group consisting of liking, sharing, reading, commenting, reposting, following a link from, searching a related hashtag, searching for related content or phrases, following the source, and favoriting;

evaluating the reliability of the users of the computer network that interact with the item of content by identifying other items of content having a known reliability with which said users have interacted; and evaluating the reliability of the item of content based on the evaluated reliability of the users that interact with the item of content, in order to determine whether the item of content is likely to be misinformation, without the need to analyze the content of the item of content.

22. The computer program product of claim 21, further comprising instructions for evaluating the reliability of the users by assessing the probability that each user will interact with misinformation.

23. The computer program product of claim 22, further comprising instructions for calculating the probability that each user will interact with misinformation based on previous interactions of the user with previously-labeled items of content having previously-determined reliability.

24. The computer program product of claim 23, further comprising instructions for calculating the probability using a graph.

25. The computer program product of claim 24, further comprising instructions for:

forming a mixed graph containing at least two different node types, called users and articles, with edges between users and articles, with user weights for user nodes and article weights for article nodes, wherein the user nodes represent individual users in the set of users and the article nodes represent individual items of content;

planting at least one seed user node and at least one seed article node into the mixed graph;

manually assigning user weights and article weights to the seed nodes;

defining neighborhoods of the seed nodes;

running a HITS-like algorithm that converges the mixed graph for the article weights and the user weights for a predetermined number of rounds, updating both users and articles while keeping the weights of the seed nodes constant to converge the mixed graph for the weights of articles and users; and outputting a set of highest weights for at least one of users or articles. wherein, said first, second, third, fourth, fifth and sixth program instructions are stored on said non-transitory computer readable medium and executed on a computing device.

* * * * *